US012558822B2

(12) United States Patent
Le Noen et al.

(10) Patent No.: US 12,558,822 B2
(45) Date of Patent: *Feb. 24, 2026

(54) FILAMENT GUIDING AND RETENTION MACHINE AND METHOD OF USE

(71) Applicant: COMPAGNIE GENERALE DES ETABLISSEMENTS MICHELIN, Clermont-Ferrand (FR)

(72) Inventors: Guillaume Le Noen, Clermont-Ferrand (FR); Franck Siler, Clermont-Ferrand (FR); Jerome Tremblier, Clermont-Ferrand (FR); Baptiste Forichon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 379 days.

This patent is subject to a terminal disclaimer.

(21) Appl. No.: 17/634,573

(22) PCT Filed: Jul. 7, 2020

(86) PCT No.: PCT/EP2020/069057
§ 371 (c)(1),
(2) Date: Feb. 11, 2022

(87) PCT Pub. No.: WO2021/028120
PCT Pub. Date: Feb. 18, 2021

(65) Prior Publication Data
US 2022/0266483 A1 Aug. 25, 2022

(30) Foreign Application Priority Data
Aug. 12, 2019 (FR) ...................................... 1909159

(51) Int. Cl.
*B29C 43/34* (2006.01)
*B29C 43/24* (2006.01)
(Continued)

(52) U.S. Cl.
CPC .............. *B29C 43/34* (2013.01); *B29C 43/24* (2013.01); *B29C 43/28* (2013.01); *B29C 70/20* (2013.01);
(Continued)

(58) Field of Classification Search
CPC ......... B29C 43/34; B29C 43/24; B29C 43/28; B29C 2043/3422; B29C 70/20; B29C 70/16; B65H 57/16
See application file for complete search history.

(56) References Cited

U.S. PATENT DOCUMENTS 5,609,705 A 3/1997 Laurent et al.
5,863,368 A 1/1999 Perrin
(Continued)

FOREIGN PATENT DOCUMENTS

DE 1938494 A1 2/1970
DE 205849 1/1984
(Continued)

OTHER PUBLICATIONS

SU459350_English Translation (Year: 1975).*
International Search Report dated Sep. 23, 2020, in corresponding PCT/EP2020/069057 (3 pages).

*Primary Examiner* — Yunju Kim
(74) *Attorney, Agent, or Firm* — VENABLE LLP

(57) ABSTRACT

A guidance and maintenance machine (100) includes a guide roller (102) and an application roller (104), each having a plurality of respective grooves (102a, 104a) defined on a respective circumferential surface (102b, 104b). The guidance and maintenance machine includes at least one prepa-
(Continued)

ration comb (200) having a support (202) with an upper surface (202d) from which a plurality of teeth (204) extend. The teeth, with a predetermined uniform height, are aligned in parallel along a length of the support and are positioned at a pitch between them in correspondence with corresponding grooves (102a) of the guide roller (102) so that the comb (200) feeds filaments (50) from a supply creel (304), where the filaments are stored, to the guide roller (102) at a predetermined pitch positioning outside the guide roller.

12 Claims, 5 Drawing Sheets

(51) Int. Cl.
B29C 43/28 (2006.01)
B29C 70/20 (2006.01)
B65H 57/16 (2006.01)
*B29K 21/00* (2006.01)
*B29K 105/10* (2006.01)

(52) U.S. Cl.
CPC ...... B65H 57/16 (2013.01); *B29C 2043/3422* (2013.01); *B29K 2021/00* (2013.01); *B29K 2105/101* (2013.01); *B65H 2404/111* (2013.01); *B65H 2701/36* (2013.01)

(56) References Cited

U.S. PATENT DOCUMENTS

| 7,998,298 | B2 | 8/2011 | Tatara et al. |
|---|---|---|---|
| 2005/0048280 | A1 | 3/2005 | Stamper et al. |
| 2007/0122605 | A1 | 5/2007 | Downing |
| 2009/0249598 | A1 | 10/2009 | Tatara et al. |
| 2009/0317543 | A1 | 12/2009 | Stamper et al. |
| 2022/0266560 | A1 | 8/2022 | Le Noen et al. |
| 2024/0051784 | A1 | 2/2024 | Jego et al. |

FOREIGN PATENT DOCUMENTS

| EP | 0 557 615 | A1 | 9/1993 |
|---|---|---|---|
| EP | 0 724 949 | A1 | 8/1996 |
| EP | 3 124 196 | A1 | 2/2017 |
| EP | 3345736 | A1 | 7/2018 |
| EP | 3369543 | A1 | 9/2018 |
| FR | 2205534 | | 5/1974 |
| GB | 649335 | | 1/1951 |
| GB | 1440081 | | 6/1976 |
| JP | 6-79759 | U | 11/1994 |
| JP | 2011-194572 | A | 10/2011 |
| SU | 459350 | A1 | 2/1975 |
| WO | 99/06315 | A1 | 2/1999 |
| WO | 2007/010599 | A1 | 1/2007 |
| WO | 2017/072948 | A1 | 5/2017 |

* cited by examiner

FILAMENT GUIDING AND RETENTION MACHINE AND METHOD OF USE

TECHNICAL DOMAIN

The invention relates to a process of aligning filaments in a calender line in which multiple filaments, extending in a warp direction and aligned in the form of a ply, are covered with rubber to make reinforced rubber plies for producing tires. The invention also relates to a guiding and retention machine using such a process.

BACKGROUND

In the field of tires, it is required that the tire exhibit various performances (e.g., reduced rolling resistance, better wear resistance, comparable grip in wet and dry conditions, sufficient mileage, etc.). Tires are therefore composed of reinforced rubber plies having different types of rubber compounds with reinforcements of filaments or strips embedded in the rubber material. The nature of the filaments and the nature of the rubber are chosen according to the desired final characteristics. As used herein, the term "filament" includes, without limitation, metallic (such as steel wire, film or cable), synthetic or textile reinforcing elements (or "reinforcements").

In order to produce reinforced rubber plies, it is known to calender metal reinforcements between two layers of unvulcanized rubber in order to produce reinforced rubber plies. As an example, as shown in FIG. 1, a reinforced rubber sheet 10 has a plurality of continuous metal wires 12 having a common geometry. The wires 12 are laid parallel to each other and extend longitudinally between opposite ends of a rubber layer 14. After calendering, the wires 12 are evenly spaced from one another and also evenly positioned so that a center $C_{12}$ of each wire remains collinear along a defined longitudinal axis X through the thickness of the rubber layer 14. Preferably, the longitudinal and vertical alignment of the wires 12 is ensured in such a way that a maximum tolerance for a displacement $D_{12}$, measured between each wire center $C_{12}$ and the longitudinal axis X of the rubber layer 14, does not exceed a predetermined tolerance for the particular rubber layer being assembled (they are "aligned" and in "alignment"). The resulting plies are cut to size and assembled to form a tire blank.

To supply tire blank manufacturing machines (such as calendering machines that form a calendering line), known creel systems support a plurality of spools held in uniform rows, with each spool supporting a filament-wound material (or "filament"). In order to obtain a good quality ply, a plurality of filaments must be guided and maintained as they are fed to the rubber products. Each of the filaments is therefore moved to known guide and application rollers for positioning in a ply in a state where all filaments are aligned at predetermined intervals (as shown in FIG. 1). Such a guide roller includes circumferential grooves that are formed at a predetermined pitch in an axial direction. The guide roller is brought into contact, at a certain pressure, with an application roller having circumferential grooves corresponding to the grooves of the guide roller. The filaments are mounted in a state in which the rubber material covers the already aligned filaments. Several solutions exist to realize this alignment, including solutions disclosed by publication WO2007/010599 (concerning a method for aligning reinforcements in a calendering line), publication WO2017/072948 (concerning a device for replacing filaments in a ply production system having at least two creel systems) and publication EP3124196 (concerning a metal reinforcement covering device having a movable reinforcement application device).

In addition, there are calendering machines for applying an elastomer to a known substrate (e.g., metal and/or fabric substrate). Such a machine proposed by Rodolfo Comerio Srl includes a group of cylinders with a first working cylinder ("first cylinder") and a second working cylinder ("second cylinder") that are located on each side of the substrate and define a gap for the substrate. In order to adjust the gap, a first adjustment device acts on the first cylinder to move it along an adjustment direction away from, or towards, the second cylinder. The group of cylinders also includes at least a first counter cylinder for calendering and spreading an elastomer on the surface of the first working cylinder. The first counter cylinder arranged adjacent to the first working cylinder rotates in the opposite direction to the first working cylinder. In order to adjust a gap existing between the first counter-cylinder and the first working cylinder, a second adjusting device acts on the first counter-cylinder to impart a thrust force of the first counter-cylinder in a predetermined direction toward the first working cylinder. The first and second working cylinders exert a thrust on the substrate to apply the elastomer to the substrate and to couple the elastomer to the substrate. Such a machine also includes a hydrostatic support for the first working cylinder to slide in the direction of adjustment and to hydrostatically support the thrust exerted by the first counter-cylinder (see publication EP3345736B1).

None of the proposed solutions discloses the guiding and maintenance of the filaments by means of a preparation comb(s) mounted on the guide roller(s), ensuring a quick placement of the filaments in the grooves of the guide rollers (i.e., a filament "anti-jump" maintenance function). Furthermore, none of the proposed solutions discloses one or more mobile guide rollers that, by moving towards a corresponding application roller, permits formation of an anti-jumping box of filaments by capture (or "imprisonment") and to maintain the positioning at the desired pitch whatever the traction. Thus, the disclosed invention combines the benefits of both functions for the purpose of facilitating the preparation and controlling the placement of filaments before and during a calendering process.

SUMMARY OF THE INVENTION

The invention relates to a guiding and maintenance machine for positioning filaments at a predetermined pitch in a calendering cycle that carries out the manufacture of plies using the filaments. The guiding and maintenance machine includes a cylinder group that includes a guide roller having a predetermined diameter and a longitudinal axis about which the guide roller rotates, the guide roller having a plurality of circumferential grooves defined on a circumferential surface of the guide roller in correspondence with the number of filaments to be aligned during a guiding and holding process. The cylinder group also includes an application roller having a predetermined diameter and a longitudinal axis about which the application roller rotates, the application roller having a plurality of circumferential grooves defined on a circumferential surface thereof in correspondence with the number of grooves of the guide roller. The guiding and maintenance machine includes at least one preparation comb with a support having a predetermined length between two opposite ends and a predetermined width between a front surface and a top surface from which a plurality of teeth extend, the teeth having a predetermined uniform height and being aligned and parallel along the length of the support. The teeth are positioned at a pitch in correspondence with the grooves of the guide roller so that the preparation comb feeds the filaments from a supply creel to the guide roller, these being positioned at a predetermined pitch outside the guide roller. The guide roller is movable relative to the application roller between an open position, in which the filaments are fed to the guide roller, and a closed position, in which the guide roller approaches the application roller to capture the filaments between the respective grooves of the guide roller and the application roller.

In certain embodiments of the machine, the guiding and maintenance machine includes a pair of preparation combs having at least one mobile comb and at least one fixed comb mounted in alignment with a preparation zone such that the teeth of the mobile comb and those of the teeth of the fixed comb are aligned to allow the passage of filaments through the pair of preparation combs from the supply creel to the guiding and maintenance machine.

In certain embodiments of the machine, the mobile comb is positioned between the preparation zone and the guide roller in such a way that the pitches between the teeth of the mobile comb are aligned with the corresponding grooves in the guide roller.

In some embodiments, the mobile comb is installed either tangentially or perpendicularly to the circumferential surface of the guide roller.

In some embodiments of the machine, the pitch of the teeth is at least 0.7 mm and at most 1.4 mm.

The invention also relates to a calendering system for making reinforced rubber plies, the calendering system including:

the disclosed guiding and maintenance machine;

a supply creel that supports a plurality of spools positioned in uniform rows, and each spool supporting a filament, each filament being fed from the spools to an outlet of the supply creel to the guiding and maintenance machine; and a calendering machine including a calender cylinder on which at least one rubber layer is arranged to form the plies with the aligned and mutually parallel filaments with a predetermined density.

In certain embodiments of the system, the calendering system further includes a preparation zone having a pair of preparation combs with at least one mobile comb and at least one fixed comb mounted in alignment such that the teeth of the mobile comb and the teeth of the fixed comb are aligned to allow the passage of the filaments through the pair of preparation combs from the outlet of the supply creel to the guiding and maintenance machine.

The invention also relates to a guiding and maintenance process performed by the disclosed system during a calendering cycle, the process including the following steps:

a step of feeding the filaments toward one or more combs from the exit of the supply creel to the guiding and maintenance machine;

a step of conveying the filaments between the supply creel and the guide roller of the machine;

a step of inserting the filaments into the corresponding grooves of the guide roller of the guiding and maintenance machine; and a step of moving the guide roller between the open position and the closed position to capture the filaments between the guide roller and the application roller so that the respective filaments enter the corresponding grooves of the application roller maintaining the aligned state of the filaments.

In certain embodiments of carrying out the process, the step of conveying the filament includes a step of simultaneously pulling a mobile comb and the filaments to the guide roller of the guiding and maintenance machine.

In some embodiments of the process, the pulling of the mobile comb is carried out in such a way that the pitches between the teeth of the mobile comb are aligned with the corresponding grooves of the guide roller.

In some embodiments of the process, the pulling of the mobile comb is carried out such that the mobile comb is installed either tangentially or perpendicularly to the circumferential surface of the guide roller.

In some embodiments of the process, the process further includes a step of transferring the filaments, in an aligned state and positioned in the grooves of the guide roller, to the grooves of the application roller.

In certain embodiments of the process, the process also includes a step of maintaining the mobile comb in the installed position.

In some embodiments of the process, the process also includes a step of returning the mobile comb to the preparation zone after the end of a calendering cycle.

The invention also relates to a calendering cycle including the disclosed method, the calendering cycle further including a step of feeding the calender cylinder of the calendering machine with the filaments aligned by the guiding and maintenance machine.

Other aspects of the invention will become evident from the following detailed description.

BRIEF DESCRIPTION OF THE DRAWINGS

The nature and the various advantages of the invention will become more obvious when reading the following detailed description, together with the attached drawings, in which the same reference numbers designate identical parts everywhere, and in which.

DETAILED DESCRIPTION

Figure 1:
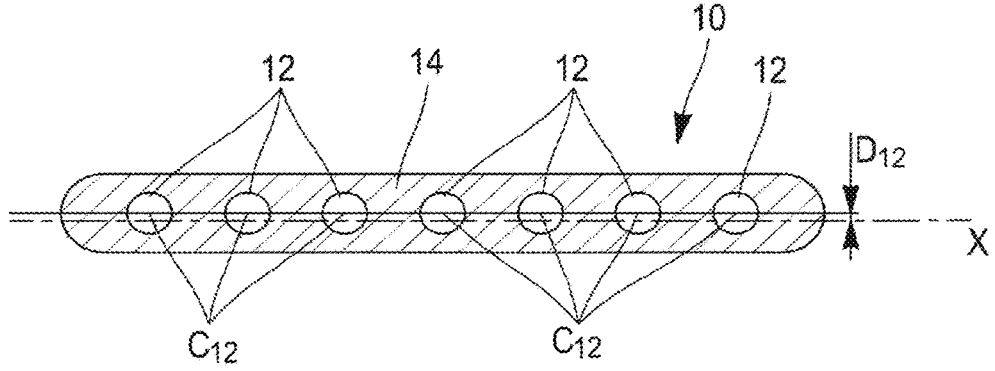
FIG. 1 shows a side cross-sectional view of a known reinforced rubber ply.
Figure 2:
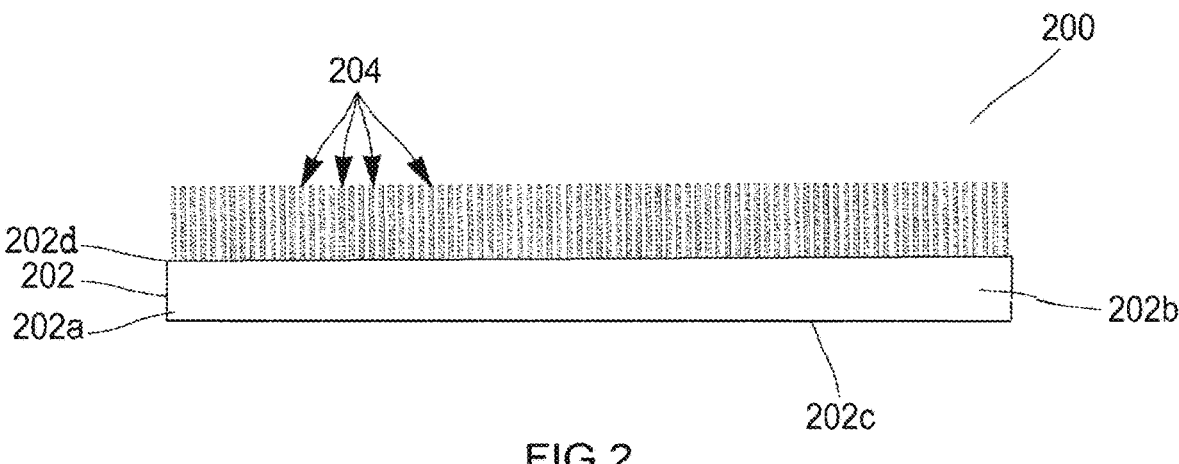
FIG. 2 shows a side view of an embodiment of a preparation comb that is provided with the guiding and maintenance machine of the invention.

Referring now to the figures, in which the same numbers identify the same elements, a mode of realization of a guiding and maintenance machine (or "machine") 100 of the invention is represented with one or more preparation combs 200 supplied with the machine (an embodiment of a preparation comb 200 is shown in FIG. 2 and described in the following description). The machine 100 can be part of a calendering system (or "system") 300 that performs a calendering cycle to form reinforced rubber plies (for example, such as the ply 10 shown in FIG. 1). An example of such a system is represented by, and described in relation to, FIG. 6.

The plies coming out of the machine 100 include different types of rubber compounds with reinforcing filaments embedded in the rubber material. Examples of suitable filaments include, without limitation, micro10 alloy carbon steel wires (0.9% carbon and 0.2% chromium) of the UHT type having a tensile strength ($R_m$) of approximately 3650 MPa (breaking force of 258 N) and a total elongation at break ($A_t$) of 2.3% ($R_m$ and $A_t$ being measured under tension in accordance with ISO 15 6892 of 1984). Each filament may be any individual steel reinforcement having a cross-sectional dimension (either diameter or thickness) greater than 100 μm. The filaments can have any suitable cross-sectional geometry.

A rubber ply used in a calendering cycle performed by the system 300 includes a conventional rubber-based composition for calendering plies, and its thickness can be adapted to the product in which it will be placed (e.g., in a belt). The rubber layer can be made from a diene elastomer, i.e., any elastomer derived at least in part from diene monomer. This diene elastomer can be selected from polybutadienes (BR), natural rubber (NR), synthetic polyisoprenes (IR), butadiene copolymers, isoprene copolymers and mixtures of these elastomers, such copolymers being selected from butadiene-styrene copolymers (SBR), isoprene-butadiene copolymers (BIR), isoprene-styrene copolymers (SIR), and isoprene-butadiene-styrene copolymers (SBIR). A rubber composition selected for the rubber ply may contain one or more diene elastomers and one or more additives commonly used in rubber matrices for the manufacture of tires. Such fillers include, without limitation, carbon black, silica, coupling agents, anti-aging agents, antioxidants, plasticizers, extender oils, plasticizing resins having a high glass transition temperature (above 30° C.), agents improving the processability of the raw compositions, tackifying resins, anti-reversion agents, methylene acceptors and donors, reinforcing resins, known adhesion promoter systems of the metal salt type and a crosslinking or vulcanization system. A person of skill in the art understands how to adjust the formulation of the rubber composition to obtain the desired properties for a specific tire.

Referring to FIGS. 2 to 6, the machine 100 includes a group of grooved cylinders that apply several filaments 50 to a rubber ply arranged on a calender roller 302 (shown in FIGS. 7 to 11) of a calendering machine of the system 300. The calendering machine is selected from commercially available calendering machines, including the types disclosed by patent EP3345736 and proposed by Rodolfo Comerio Sri. The filaments 50 are applied to the rubber ply so that they are aligned parallel to each other at a predetermined density (see FIGS. 3, 4 and 5).

The cylinder group of the machine 100 includes a guide roller 102 with a predetermined diameter and with a longitudinal axis around which the guide roller rotates. Several circumferential grooves 102a are defined on a circumferential surface 102b of the guide roller corresponding to the number of filaments 50 that must be aligned during a guiding and maintenance process (see FIGS. 4 and 5). In such a process, the filaments 50 arrive at the guide roller 102 in advance of their application to the rubber ply waiting on the calender cylinder 302.

The cylinder group of the machine 100 also includes an application roller 104 with a predetermined diameter and a longitudinal axis around which the guide roller rotates. Several circumferential grooves 104a are defined on the circumferential surface 104b of the application roller corresponding to the number of grooves of the guide roller 102 (see FIGS. 4 and 5).

It is understood that the number of grooves 102a, 104a shown in the figures is given as an example and is not limited to the number of grooves shown. The number, density and/or geometry of the grooves 102a, 104a can be adapted according to the characteristics of the filaments and/or the properties of the rubber ply.

Referring again to FIGS. 2 to 6, the guide roller 102 is movable relative to the application roller 104 between an open position, where the filaments 50 are fed to the guide roller (see FIG. 4), and a closed position, where the fed filaments are guided and maintained in alignment between the respective grooves 102a, 104a of the rollers 102, 104 (see FIG. 5). In the open position, the two rollers 102, 104 are positioned in such a way that the filaments 50 fed to the machine 100 are easily deposited in the grooves 102a of the guide roller 102. In the closed position, the two rollers 102, 104 are positioned face to face on either side of the filaments 50 to transfer the filaments between the grooves 102a of the guide roller 102 and the grooves 104a of the application roller 104, this transfer being done without loss of alignment of the filaments. The opening and closing of the guide roller 102 can be realized by known means (e.g., by a rotary closing device or its known equivalents). The opening and/or closing of the guide roller can be performed automatically or manually to ensure the positioning of the filaments 50 during a guiding and maintenance process of a calendering cycle.

To ensure an aligned introduction of the filaments 50 to the guide roller 102, at least one preparation comb (or "comb") 200 is supplied with the machine 100. Referring to FIG. 2, each comb 200 includes a support 202 of a predetermined length between two opposite ends 202a, 202b. The support 202 has a predetermined width between a front surface 202c and a top surface 202d from which a plurality of teeth 204 extend. The teeth 204 have a predetermined uniform height and are aligned and parallel along the length of the support 202. The teeth 204 are positioned at a suitable pitch in accordance with the guiding and maintenance process and in correspondence with associated grooves 102a of the guide roller 102. In some embodiments of the comb, the teeth 204 are positioned at a pitch of at least 0.7 mm and at most 1.4 mm (also in correspondence with the associated grooves 102a of the guide roller 102).

The filaments 50 are introduced into the comb 200 from a supply creel 304 of the system 300 incorporating the machine 100 and at least one comb 200. The supply creel 304 supports a plurality of spools 305 held in uniform rows, and each spool 305 supports a filament 50. Each filament 50 is carried in a known manner by a guide from the spools 305 to an outlet 304a of the supply creel. The supply creel 304 is selected from commercially available supply creels.

Figures 5, 6:
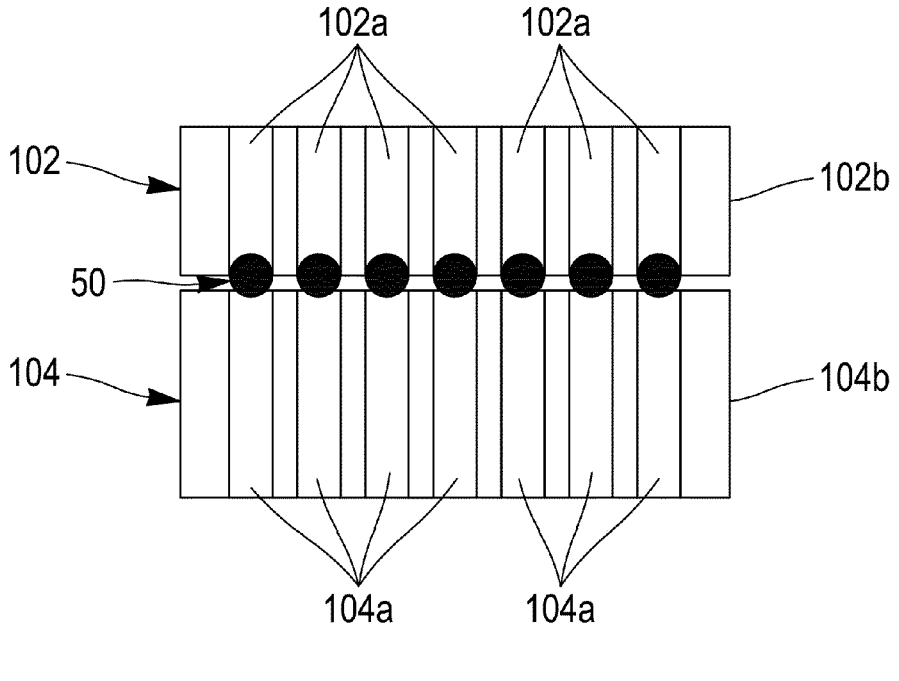
FIG. 6 shows a schematic perspective view of a calendering system incorporating the guiding and maintenance machine of the invention including the preparation comb of FIG. 2.
Figure 7:
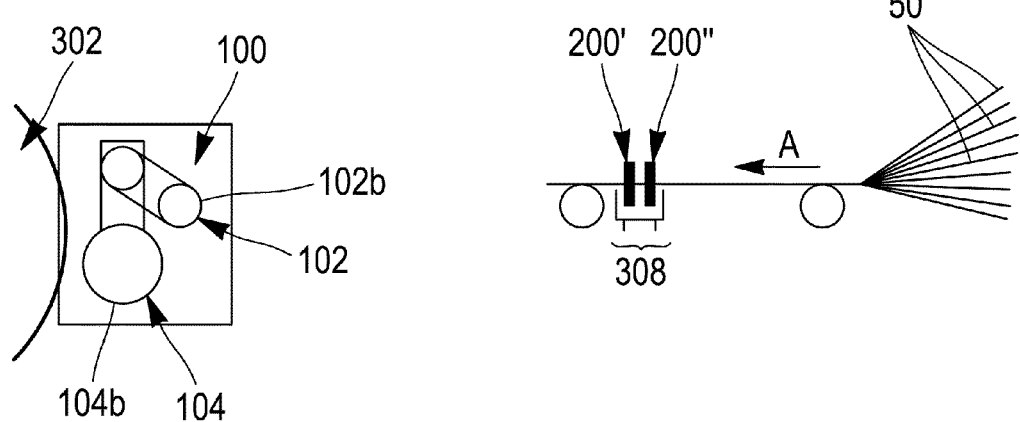
FIGS. 7 to 11 represent steps of an embodiment of a cycle including a guiding and maintenance process of the invention.

In the embodiment of the system 300 of FIG. 6, the filaments 50 are transferred from the outlet 304a of the supply creel 304 to a preparation zone 308 incorporating at least one comb 200. It is understood that the preparation zone 308 can be arranged anywhere along a path between the outlet 304a of the supply creel 304 and the machine 100, and that one or more combs 200 can be installed in relation to the machine 100 to guide the filaments 50 directly to the corresponding grooves 102a of the guide roller 102. For example, one or more combs can be installed tangentially adjacent to the circumferential surface 102*b* of the guide roller 102.

Figures 3, 4:
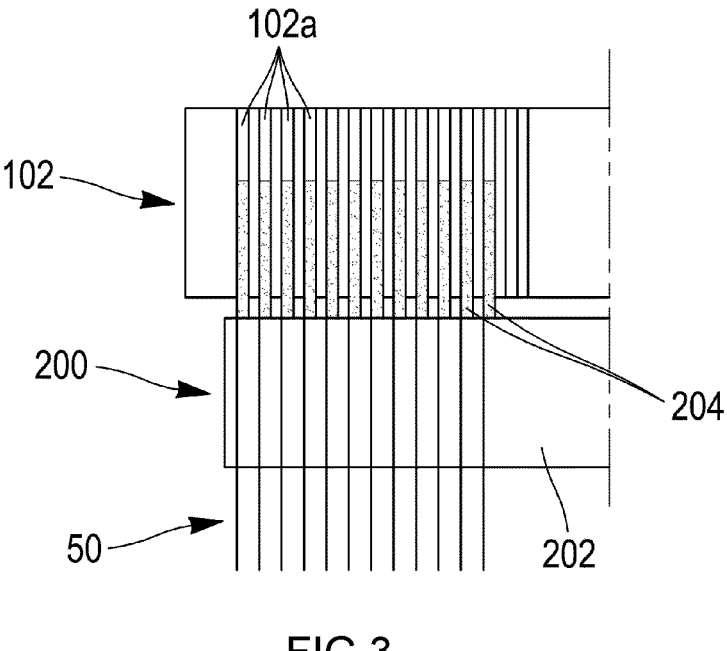
FIG. 3 shows a top view of an alignment, realized by the preparation comb of FIG. 2, of the filaments and grooves of a guide roller of the guiding and maintenance machine of the invention during a guiding and maintenance process.
FIGS. 4 and 5 show a schematic top view of the guide roller of the guiding and maintenance machine of the invention in the open and closed positions, respectively.

Referring to FIG. 3, this FIG. 3 represents a top view of the alignment, realized by the comb 200, of the filaments 50 and the grooves 102*a* of the guide roller 102 of the machine 100 during a guiding and maintenance process. The function of the comb 200 is to prepare the filaments 50 for positioning at the desired pitch outside of the guide roller 102 ("positioning"). The function of the comb 200 is also to accompany the filaments 50 from the supply creel 304 to the guide roller 102 in this positioning. In this working position, fixedly installed in relation to the grooves 102*a* of the guide roller 102, one or more combs 200 allow guidance of the filaments 50 to the grooves of the guide roller and maintenance of this positioning during the use of the filaments. The guidance and maintenance of the filaments 50 by means of the comb (or combs) 200 installed in relation to the guide roller 102 ensure rapid and accurate positioning of the filaments in the corresponding grooves 102*a* of the guide roller 102.

Referring to FIGS. 4 and 5, these figures represent a schematic top view of the guide roller 102 of the machine 100 in the open position (FIG. 4) and in the closed position (FIG. 5) in relation to the application roller 104. In the open position, the filaments 50 individually feed the grooves 102*a* of the guide roller 102 during a guiding and maintenance process. In the closed position, the guide roller 102 moves closer to the application roller 104 to capture (or "trap") the filaments 50 between the respective grooves 102*a*, 104*a* of the guide roller 102 and the application roller 104. In this operating position, the guide roller 102 moves sufficiently close to the application roller 104 to form an anti-jump cage (or "box") that prevents the filaments 50 from exiting the grooves 104*a* of the application roller. The guide roller 102 is therefore used to guide and maintain the filaments 50 onto the application roller 104 with the necessary restraint. The positioning of the filaments 50 at the desired pitch is thus maintained regardless of the traction.

Referring again to FIGS. 2 to 6 and additionally to FIGS. 7 to 11, a detailed description is given of an exemplary guiding and maintenance process. Such a guiding and maintenance process is carried out during a calendering cycle effected by the system 300. It is understood that the process can be easily adapted for all embodiments of the system 300 incorporating one or more combs 200.

At the beginning of a guiding and maintenance process of the invention, the guiding and maintenance process includes a step of feeding the filaments 50 to a comb or combs 200. In the embodiment of the process represented in FIGS. 7 to 11, the feeding of the filaments 50 is carried out in a known manner from the outlet 304*a* of the supply creel 304 to the preparation zone 308 of the system 300 (see arrow A in FIG. 7). A mobile comb 200' and a fixed 200" comb (each with the same configuration as shown in FIG. 2) are mounted in alignment with the preparation zone 308 (i.e., the teeth 204 of both combs are aligned to allow the filaments 50 to pass through both combs). During this step, the fixed comb 200" initially prepares the filaments 50 for positioning at the desired pitch so that the mobile comb 200' can accompany the filaments to the guide roller 102 in this positioning.

Figure 8:
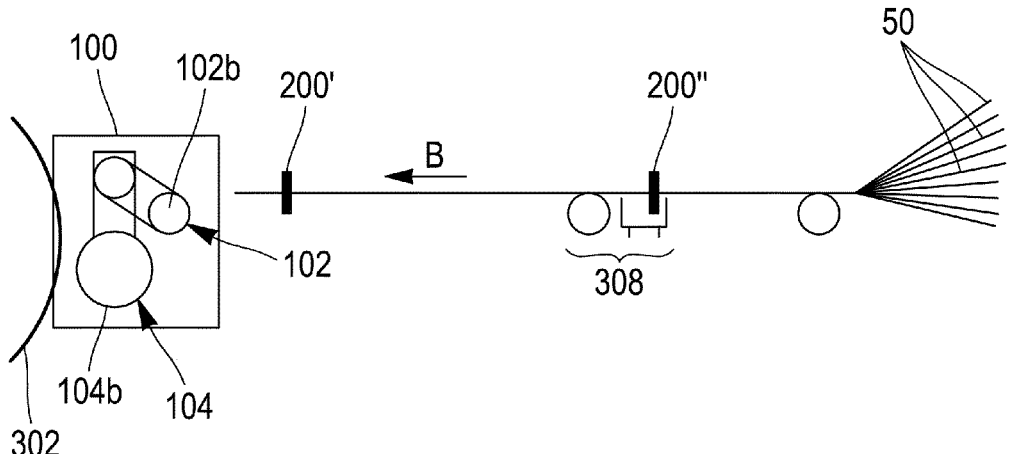

The guiding and maintenance process also includes a step of conveying the filaments 50 that arrive from the feed creel 304 to the guide roller 102 of the machine 100 (see FIG. 8). This step includes a step of pulling the mobile comb 200' and the filaments 50 simultaneously towards the machine 100 (see arrow B in FIG. 8). During this pulling, the filaments 50 are guided to the machine 100 with their position maintained. At the same time, the fixed comb 200" continues the upstream preparation of the filaments in order to maintain the filament positioning throughout the guiding and maintenance process. The pulling of the mobile comb 200' is realized up to the guide roller 102, where it is installed. In an embodiment of the process, the mobile comb 200' is installed tangentially to the circumferential surface 102*b* of the guide roller (see FIG. 9). In an embodiment of the process, the mobile comb 200' is installed perpendicularly to the circumferential surface 102*b* of the guide roller (see FIG. 11). In both embodiments, the pitches between the teeth 204 of the mobile comb 200' are aligned with the corresponding grooves 102*a* of the guide roller 102.

Figure 9:
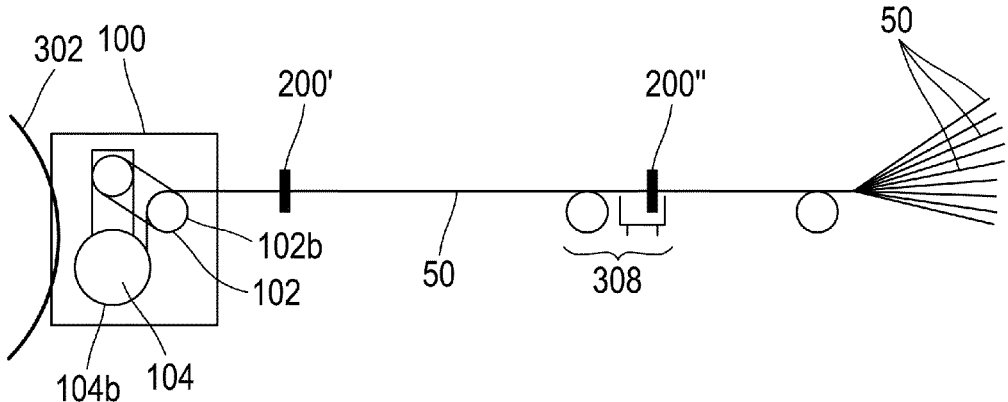
Figure 10:
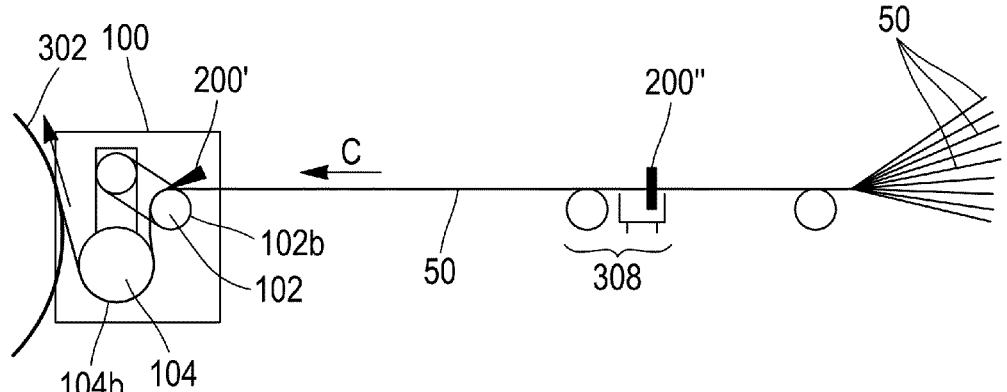

The guiding and maintenance process also includes, as part of the alignment, a step of inserting the filaments 50 into the corresponding grooves 102*a* of the guide roller 102 of the machine 100 (see FIG. 9). This step is carried out with the filaments 50 maintained in their position by the mobile comb 200' (see FIG. 3 that represents a diagram of the positioning carried out during this step). During this step, the filaments 50 are first inserted into the grooves 102*a* on one side of the upper surface 202*d* of the mobile comb 200'. In the embodiment where the mobile comb 200' is installed tangentially to the circumferential surface 102*b* of the guide roller 102, the guide roller remains in the open position during this step (see FIG. 4). During this step, the application roller 104 must be opposite to the upper surface 102*d* of the mobile comb 200' (see FIG. 10).

Figure 11:
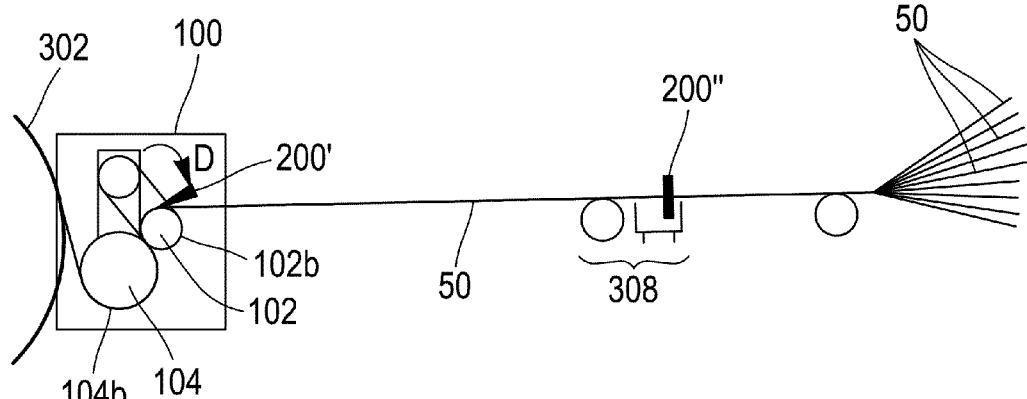

The guiding and maintenance process further includes a step of moving the guide roller 102 from the open position (shown in FIG. 4) to the closed position (shown in FIG. 5) (see arrow C in FIG. 11). During this step, the filaments 50 are captured (or "trapped") between the guide roller 102 and the application roller 104 to prevent filament jumping. The filaments 50 are then transferred, aligned and positioned in the grooves 102*a* of the guide roller 102 and the grooves 104*a* of the application roller 104 so that the respective filaments enter the corresponding grooves 104*a* of the application roller 104 while remaining aligned (see arrow D in FIG. 11). It is desirable to keep the mobile comb 200' in the installed position (either tangential or perpendicular).

In some embodiments, the guiding and maintenance process of the invention may include a step of returning the mobile comb 200' to the preparation zone 308. This step is carried out after the end of the calendering cycle. During this step, the mobile comb 200' returns to its initial position next to the fixed comb 200" while waiting for the start of a calendering cycle.

The guiding and maintenance process can be part of a calendering cycle that further includes a step of introducing the aligned filaments 50 from the machine 100 to the calender cylinder 302 of the calendering machine (see FIG. 11). During this step, a rubber ply is already deposited on a working surface of the calender cylinder 302 awaiting the production of a ply reinforced by the filaments 50. The machine 100 ensures the correct positioning of the filaments 50 to create such a ply at the end of the calendering cycle. At the end of the calendering cycle, one or more plies can be produced, that can be used, for example, as a carcass ply or as a breaker ply intended to reinforce a tire crown, lower than the tread.

At the end of the calendering cycle, the finished product may be used in a downstream process (that may be, for example, a palletizing process, a shaping process, and/or another process). The machine 100 incorporating the comb(s) 200 (including one or more mobile comb(s) 200' and one or more fixed comb(s) 200'') ensures the planarity of the continuous plies of reinforced rubber before the final assembly of the tire blank.

A guiding and maintenance process of the invention (and also a cycle of the calendering process of which this process is a part) can be controlled by PLC and can include pre-programming of management information. For example, a process setting can be defined using the properties of the filaments fed to the comb 200 and the machine 100. A process setting can also be defined using the properties of a rubber ply waiting at the calender cylinder 302.

A monitoring system could be set up for all modes of production. At least part of the monitoring system may be provided in a portable device such as a mobile network device (e.g., mobile phone, laptop computer, network-connected portable device(s) (including "augmented reality" and/or "virtual reality" devices, network-connected portable clothing and/or any combination and/or equivalent)).

In certain modes of making the invention, the machine 100 (and/or a system that incorporates the machine 10, including the system 300) may receive voice commands or other audio data representing, for example, the current state of the guidance and maintenance process in progress relative to the intended state. The response may be generated in audible, visual, tactile (e.g., using a haptic interface) and/or virtual and/or augmented form.

In an embodiment, the process may include a step of training the machine 100 (or training a system that incorporates the machine 100, including the system 300) to recognize representative characteristics of the filaments 50 leaving the supply creel 304 (for example, diameter and tensile strength values) and to compare them with target values. This step may include a step of training the machine 100 to recognize non-equivalences between the compared values. Each training step includes a classification generated by means of machine learning. This classification may include, without limitation, the parameters of the filament materials, the parameters of the plies produced, the duration of the calendering cycles and the values expected at the end of a cycle in progress (for example, the value of the space between the aligned filaments in a ply, etc.).

The machine 100 incorporating the comb 200 is suitable for processing a variety of filaments for use in a variety of rubber compounds without reducing industrial productivity.

The invention is aimed at reducing time and labor during the operation of inserting multiple filaments into grooves of a guide roller and an application roller in order to align them in a calendering system. The invention enables the rapid and ergonomic positioning of any type of filament at a controlled pitch for use in a calendering cycle that performs the manufacture of plies. The machine 100 and the comb 200 together form a device that prevents any variation of the pitch and any jump between the filaments with an easy and ergonomic preparation in time, with the aim of forming a reinforced ply of the desired width at the desired density.

The terms "at least one" and "one or more" are used interchangeably. Ranges that are presented as "between a and b" include the values "a" and "b".

While specific embodiments of the disclosed device have been illustrated and described, it is understood that various changes, additions and modifications may be made without deviating from the spirit and scope of this disclosure. Consequently, no limitations should be imposed on the scope of the invention described except those set forth in the claims annexed hereto.

The invention claimed is:

1. A guidance and maintenance machine for positioning of filaments at a predetermined pitch during a calendering cycle that effects manufacture of plies using the filaments, the guidance and maintenance machine comprising:

a cylinder group that includes a guide roller having a predetermined diameter and a longitudinal axis about which the guide roller rotates, the guide roller having a plurality of circumferential grooves defined on a circumferential surface of the guide roller in correspondence with a number of the filaments, which each have across-sectional diameter greater than 100 µm, to be aligned during a guidance and maintenance process, the cylinder group also comprising an application roller having a predetermined diameter and a longitudinal axis about which the application roller rotates, the application roller having a plurality of circumferential grooves defined on a circumferential surface of the application roller in correspondence with the number of grooves of the guide roller; and a pair of preparation combs, the pair of preparation combs including one mobile comb and one fixed comb mounted in alignment with a preparation zone, wherein each of the pair of preparation combs includes a support having a predetermined length between two opposite ends and a predetermined width between a front surface and a top surface from which a plurality of teeth extend, the teeth having a predetermined uniform height and being aligned and parallel along the predetermined length of the support, the teeth being positioned at a pitch in correspondence with the grooves of the guide roller, wherein the pair of preparation combs feed the filaments from a supply creel to the guide roller, the filaments being positioned at a predetermined pitch outside of the guide roller, and the teeth of the mobile comb and the teeth of the fixed comb are aligned to allow a passage of the filaments through the pair of preparation combs from the supply creel to the guide roller, wherein the guide roller is movable relative to the application roller between an open position, in which the filaments are fed to the guide roller, and a closed position, in which the guide roller approaches the application roller to capture the filaments between the respective grooves of the guide roller and the application roller, wherein the mobile comb is installed tangentially or perpendicularly to a corresponding circumferential surface of the guide roller, wherein the mobile comb is positioned between the preparation zone and the guide roller such that the pitch between the teeth of the mobile comb is aligned with corresponding grooves of the guide roller and is configured to be pulled simultaneously with the filaments towards the guide roller of the guidance and maintenance machine to lead the filaments to the guide roller and is configured to be returned to the fixed comb, which corresponds to the mobile comb attributed to the guide roller, in the preparation zone after completion of the calendaring cycle, wherein the grooves of the guide roller have a width of at least 0.7 mm and at most 1.4 mm, and the teeth of the mobile comb leading the filaments to the guide roller and the teeth of the fixed comb corresponding to the mobile comb leading the filaments to the guide roller each have a pitch of at least 0.7 mm and at most 1.4 mm such that the teeth of the mobile comb leading the filaments to the guide roller and the teeth of the fixed comb corresponding to the mobile comb leading the filaments to the guide roller each correspond with the grooves of the guide roller, and wherein the guidance and maintenance machine is configured to maintain the open position before the mobile comb is installed tangentially or perpendicularly to the circumferential surface of the guide roller and to move the guide roller to the closed position after the mobile comb is installed tangentially or perpendicularly to the circumferential surface of the guide roller.

2. The guidance and maintenance machine of claim 1, wherein the mobile comb is installed tangentially to the corresponding circumferential surface of the guide roller.

3. The guidance and maintenance machine of claim 1, wherein the mobile comb is installed perpendicularly to the corresponding circumferential surface of the guide roller.

4. A calendering system for manufacturing reinforced rubber plies, the calendering system comprising:

the guidance and maintenance machine of claim 1;

a supply creel that supports a plurality of bobbins positioned in uniform rows, each bobbin supporting one of the filaments, and each filament being fed from the bobbins to an outlet of the supply creel to the guidance and maintenance machine; and a calendering machine comprising a calender cylinder upon which at least one rubber ply is arranged to form the plies with the filaments aligned and parallel to each other with a predetermined density.

5. A method of guiding and maintenance effected by the calendering system of claim 4 during a calendering cycle, the method comprising the following steps:

a step of feeding the filaments toward one or more preparation combs from the outlet of the supply creel of the calendering system;

a step of conveying the filaments between the supply creel and the guide roller of the guidance and maintenance machine;

a step of inserting the filaments into corresponding grooves of the guide roller of the guidance and maintenance machine; and a step of moving the guide roller between the open position and the closed position to capture the filaments between the guide roller and the application roller so that the respective filaments enter corresponding grooves of the application roller while maintaining an aligned state of the filaments.

6. The method of claim 5, wherein the step of conveying the filaments comprises a step of simultaneously pulling the mobile comb and the filaments toward the guide roller of the guidance and maintenance machine.

7. The method of claim 6, wherein the pulling of the mobile comb is realized such that the pitch between the teeth of the mobile comb are aligned with the corresponding grooves of the guide roller.

8. The method of claim 7, wherein the pulling of the mobile comb is realized such that the mobile comb is installed either tangentially or perpendicularly to the circumferential surface of the guide roller.

9. The method of claim 8, further comprising a step of transferring the filaments in the aligned state and positioned in the grooves of the guide roller to the grooves of the application roller.

10. The method of claim 8, further comprising a step of maintaining the mobile comb in an installed position.

11. The method of claim 10, further comprising a step of returning the mobile comb to the preparation zone after completion of the calendering cycle.

12. A calendering cycle comprising the method of claim 6, the calendering cycle further comprising a step of feeding the calender cylinder of the calendering machine with the filaments aligned by the guidance and maintenance machine.

* * * * *